United States Patent [19]

Kirsch et al.

[11] Patent Number: 5,051,460

[45] Date of Patent: Sep. 24, 1991

[54] STABILIZED HALOPOLYMER COMPOSITIONS

[75] Inventors: Sheldon J. Kirsch, Rockaway; Chii-Shu Chen, Parsippany, both of N.J.

[73] Assignee: Ausimont, U.S.A., Inc., Morristown, N.J.

[21] Appl. No.: 408,922

[22] Filed: Sep. 18, 1989

[51] Int. Cl.$^5$ ............................................. C08K 5/526
[52] U.S. Cl. ...................................... 524/114; 524/91; 524/151; 524/291; 524/392; 524/400
[58] Field of Search ............... 524/392, 291, 91, 400, 524/151, 114; 523/435

[56] References Cited

U.S. PATENT DOCUMENTS

| | | | |
|---|---|---|---|
| 2,888,364 | 5/1959 | Bauer | 523/435 |
| 3,745,145 | 7/1973 | Khattab et al. | 524/400 |
| 3,772,246 | 11/1973 | Buchholz | 524/392 |
| 4,539,354 | 9/1985 | Chung et al. | 524/291 |
| 4,681,905 | 7/1987 | Kubota et al. | 524/91 |
| 4,775,709 | 10/1988 | Chandrasekaran et al. | 524/151 |

FOREIGN PATENT DOCUMENTS 48-16977  5/1973  Japan .

*Primary Examiner*—Veronica P. Hoke
*Attorney, Agent, or Firm*—John G. Gilfillan; Elliot M. Olstein; Raymond J. Lillie

[57] ABSTRACT

A stabilized melt processable composition containing a halopolymer (e.g., an ethylene chlorotrifluoroethylene copolymer) and an effective stabilizing amount of an ester of a (4-hydroxy-5-alkylphenyl) alkanoic acid and at least one phosphite. Such compositions may be melt processed and extruded at high temperatures (e.g., up to 305° C.) and retain their stability. These compositions are especially desirable in wire and cable coating applications.

19 Claims, No Drawings

STABILIZED HALOPOLYMER COMPOSITIONS

This invention relates to stabilized halopolymer compositions which are resistant to decomposition and/or crosslinking, discoloration and bubble formation and/or gaseous discharge when subjected to melt processing or extrusion temperatures. More particularly, this invention relates to a halopolymer which includes effective stabilizing amounts of an ester of an alkanoic acid and at least one phosphite.

Thermal stability of halopolymers, in particular fluoropolymers such as, for example, ethylene/chlorotrifluoroethylene copolymers, is important in maintaining their chemical, mechanical and electrical properties. Loss of thermal stability during melt processing or extrusion of these polymers at elevated temperatures may lead to decomposition and/or crosslinking, discoloration or bubble formation in and/or gaseous discharge from the polymer compositions. In wire and cable coating applications, extrusion temperatures may reach approximately 300° C.

U.S. Pat. No. 3,745,145 discloses a copolymer composition comprising an ethylene/chlorotrifluoroethylene copolymer from 0.01 wt. % to 30 wt. % by weight of the polymer of a transesterified reaction product an organic polyhydric phenol and an organic phosphite triester, from 0.01 wt. % to 10. wt. % of a salt of a monocarboxylic acid having from 6 to about 24 carbon atoms and a metal of Group II of the periodic table, and from 0.01 wt. % to 10 wt. % of the polymer of an ester or alkali metal salt of thiodipropionic acid.

U.S. Pat. No. 4,496,677 discloses a stabilized fluoropolymer composition having from 0.2 wt. % to 3 wt. % by weight of the polymer of a hindered phenol pentaerthritol diphosphite, and may also include from 0.01 wt. % to 3.0 wt. % of a salt of a monocarboxylic acid having from 6 to 24 carbon atoms and a metal of Group II of the periodic table.

U.S. Pat. No. 4,539,354 discloses a composition comprising an ethylene/chlorotrifluoroethylene copolymer and from 0.01 wt. % to 3 wt. % by weight of the polymer of a transesterified reaction product of an organic polyhydric phenol and a phosphite triester, 0.01 wt. % to 10 wt. % of a salt of a monocarboxylic acid having from 6 to about 24 carbon atoms and a metal of Group II of the periodic table, and from 0.01 wt. % to 3.0 wt. % of an ester of a (4-hydroxy 5-alkylphenyl) alkanoic acid.

In accordance with an aspect of the present invention, there is provided a composition comprising an effective stabilizing amount of (a) an ester of a (4-hydroxy-5 alkylphenyl) alkanoic acid and (b) at least one phosphite. The ester is of the formula:

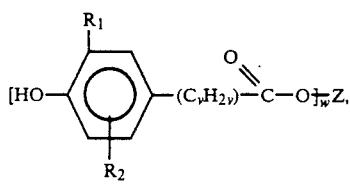

wherein $R_1$ is methyl, ethyl, or an alpha-branched alkyl group of from 3 to 10 carbon atoms; $R_2$ is hydrogen, methyl, ethyl, or an alpha-branched alkyl group of from 3 to 10 carbon atoms; v has a value from 1 to 6; w has a value of from 2 to 6; and Z is an aliphatic hydrocarbon of the formula:

$C_y H_{2y+2-w}$ in which y has a value from 2 to 18 when w is 2, and a value of 3 to 6 when w is greater than 2. The value of y in all cases is equal to or greater than that of w. The phosphite is of the formula:

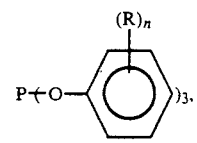

wherein R is an alkyl or cycloalkyl group having from 1 to about 18 carbon atoms, and n is at least 1.

In a preferred embodiment, the halopolymer is a fluoropolymer, and in particular, an ethylene/chlorotrifluoroethylene copolymer. The ethylene/chlorotrifluoroethylene copolymer may contain from about 40 mole % to about 60 mole % ethylene and from about 40 mole % to about 60 mole % chlorotrifluoroethylene, preferably 50 mole % ethylene and 50 mole % chlorotrifluoroethylene.

The ester of a (4-hydroxy-5-alkylphenyl) alkanoic acid may be present in an amount of from about 0.05 wt. % to about 3 wt. % based on the weight of the halopolymer, preferably from about 0.1 wt. % to about 1.5 wt. %.

The at least one phosphite may be present in an amount of from about 0.05 wt. % to about 3 wt. %, based on the weight of the halopolymer, preferably from about 0.1 wt. % to about 1.5 wt. %.

It will be observed that the alkanoic acid esters of the present invention exhibit one alkyl group ($R_1$) in a position ortho to the hydroxy group. A second like or different alkyl group ($R_2$) is optionally present either (a) in the other position ortho to the hydroxy group (the 3-position) or (b) meta to the hydroxy group and para to the first alkyl group (the 2-position). These alkyl groups will be methyl, ethyl, or when higher than ethyl, an α-branched alkyl group of from 3 to 10 carbon atoms. By the term "α-branched alkyl group" is intended one in which the carbon atom of the alkyl group which is bound to the phenyl group is also bound to at least two other carbon atoms of the alkyl group.

Thus the mono- or dialkylphenolic group includes for example 3,5-di-t-butyl-4-hydroxyphenyl, 3,5-dimethyl-4-hydroxyphenyl 3,5-di-isopropyl-4-hydroxyphenyl, 2,5-di-isopropyl-4-hydroxyphenyl, 2,5-dimethyl-4-hydroxyphenyl, 2-methyl-4-hydroxy-5-t-butylphenyl, 2-methyl-4-hydroxy-5-isopropylphenyl, 3-methyl-4-hydroxy-5-t-butylphenyl, 3,5-diethyl-4-hydroxyphenyl and the like. Preferred phenolic groups are those having at least one branched group such as isopropyl, t-butyl or the like, in a position ortho to the hydroxy group.

The mono- or dialkyl-4-hydroxyphenyl group is bound to an alkanoyl unit of from 2 to 7 carbon atoms. The hydrocarbon portion of this alkanoyl unit is represented by $—(C_vH_{2v})—$ and may be of a straight or, when v is greater than 1, branched chain. A preferred alkanoyl group is the 3-propionyl group.

Two or more (as determined by the integer w) of these mono- or dialkylphenylalkanoyl groups are then bound through a like number of oxygen atoms to the hydrocarbon residue of a polyol. The polyol from which these esters are derived will thus consist of the straight or branched chain hydrocarbon residue of the formula $C_yH_{2y+2-w}$ and a number of hydroxy groups equal to w. When w is two, i.e. the polyol is a diol, this hydrocarbon residue will have from 2 to 18 carbon atoms. When w is greater than two, i.e. the polyol is a triol, tetrol, pentol or hexol, the hydrocarbon residue will have from 3 to 6 carbon atoms. In all cases, the number of hydroxy groups and the resulting number of alkylphenylalkanoyloxy groups (as designated by w) will be equal to or less than the number of carbon atoms (y) in the hydrocarbon residue; i.e., since each carbon atom of the hydrocarbon residue can bear only one hydroxy group, y is equal to or greater than w.

Representative esters which can be used in the stabilizer system of the composition of the present invention include but are not limited to the following esters disclosed in U.S. Pat. No. 3,644,482; Esters characterized by the formula:

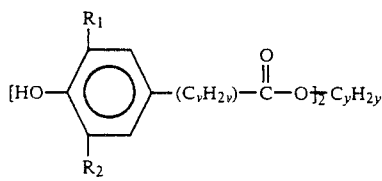

wherein each $R_1$ and $R_2$ is methyl, ethyl or an alpha-branched alkyl group of from 3 to 6 carbon atoms. Preferably, each of $R_1$ and $R_2$ is tertiary butyl. More preferably, the ester is a 3-(3,5-di-t-butyl-4-hydroxyphenyl) propionic acid diester of a diol. The diols can include: ethylene glycol; propylene glycol; 1,3-propanediol; 1,4-butanediol, 1,5-pentanediol, neopentyl glycol; 1,6-hexanediol; 1,8-octanediol; 1,9-nonanediol; 1,10-decanediol; 1,2,-dodecanediol; 1,12-octadecanediol and 1,18-octadecanediol. Specifically preferred esters include: ethylene glycol bis-[3,(3,5-di-t-butyl-4-hydroxy-phenyl) propionate]; 1,2-propylene glycol bis-[3, (3,5-di-t-butyl-4-hydroxyphenyl) propionate], neopentylglycol bis-[3,5-di-t-butyl-4-hydroxyphenyl) propionate], 1,6-hexanediol bis-]3,5-di-t-butyl -4-hydroxyphenyl) propionate]' and 1,9-nonanediol bis-[3, (3,5-di-t-butyl-4-hydroxyphenyl) propionate].

Representative esters which can be used in the stabilizer system of the present invention include esters when Z has the formula: $C_yH_{2y+2-w}$ where y has a value of from 3 to 6, and the value of y is equal to or greater than the value of w. Preferably, each $R_1$ and $R_2$ is tertiary butyl. More preferably the esters include: pentaerythritol tetrakis-[3-(3,5di-t-butyl-4-hydroxyphenyl) propionate]; 1,1,1-trimethylolethane tris [3,(3,5-di-t-butyl-4-hydroxyphenyl) propionate]; 1,1,1-trimethylopropane tris [3,(3,5-di-t-butyl-4-hydroxyphenyl) propionate]; glycerine tris [3,(3,5-di-t-butyl-4-hydroxyphenyl) propionate]; and sorbitol hexakis [3-(3,5-di-t-butyl-4-hydroxphenyl) propionate].

Representative esters which can be used in the stabilizer system of the present invention also include pentaerythritol tetrakis [3-(3-methyl-4-hydroxy-5-t-butylphenyl) propionate] and pentaerythritol tetrakis [3-(3,5-dimethyl-4-hydroxyphenyl) propionate]. A most preferred ester is tetrakis [methylene 3-(3',5'-di-tert-butyl-4'-hydroxyphenyl, propionate].

In another preferred embodiment, the at least one phosphite consists of a mixture of:

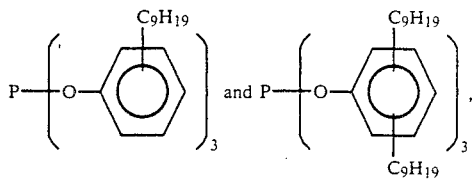

known as tris (monononylphenyl) phosphite and tris (di-nonylphenyl) phosphite, respectively. The mixture may contain from about 70 wt. % to about 95 wt. % tris (monononylphenyl) phosphite and from about 5 wt. % to about 30 wt. % tris (di-nonylphenyl) phosphite, preferably about 87.5% wt. % tris (monononylphenyl) phosphite and about 12.5 wt. % tris (di-nonylphenyl) phosphite. An embodiment of such a mixture of tris (monononylphenyl) phosphite and tris (di-nonylphenyl) phosphite is Polygard, sold by Uniroyal Co.

The composition may, in yet another preferred embodiment, further comprise an effective stabilizing amount of a thoiester, which may be present in an amount of from about 0.02 wt. % to about 3 wt. % based on the weight of the halopolymer, preferably from about 0.05 wt. % to about 1.0 wt. %. A preferred thoiester is distearylthiodipropionate, or DSTDP.

In another embodiment, the composition may further comprise an effective amount of a sulfide selected from the group consisting of:

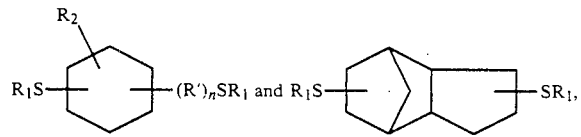

wherein $R_1$ is an alkyl group having from about 8 to about 20 carbon atoms, $R_2$ is H or an alkyl group having from 1 to about 4 carbon atoms, R' is an alkyl or alkenyl group having up to about 12 carbon atoms, and n is 0 or 1.

Preferably, the sulfide is of the formula:

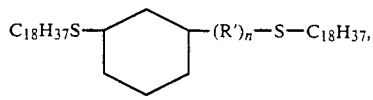

wherein R' is an alkyl or alkenyl group having up to about 12 carbon atoms, and n is 0 or 1. In a preferred embodiment, n is 1 and R' is an ethyl group, and the sulfide is 1-[β-(n-octadecylthio) ethyl]-3(n-octadecylthio) cyclohexane. An example of this compound is sold as Anoxsyn 442 by Pennwalt Corporation. Sulfide compounds of the types hereinabove described are disclosed in U.S. Pat. Nos. 3,652,680 and 3,772,246.

The sulfide may be present in an amount of from about 0.02 wt. % to about 2 wt. % based on the weight of the halopolymer, preferably from about 0.05 wt. % to about 1.0 wt. %.

In an alternative embodiment, the composition may comprise an effective stabilizing amount of zinc stearate, with or without a thioester being present as an additional component. The zinc stearate may be present in an amount of from about 0.03 wt. % to about 1.0 wt. % based on the weight of the halopolymer, preferably from about 0.1 wt. % to about 0.25 wt. %.

When the thioester is an additional component, the composition may further comprise an effective stabilizing amount of bis [2-hydroxy-5-t-octyl-3-(benzotriazol-2-yl) phenyl] methane, which may be present in an amount of from about 0.02 wt. % to about 2 wt. % based on the weight of the halopolymer, preferably from about 0.04 wt. % to about 0.5 wt. %.

In yet another alternative embodiment, the composition may further comprise in addition to the thioester, an effective stabilizing amount of at least one reaction product of epichlorohydrin and bisphenol A, said at least one reaction product being of the formula:

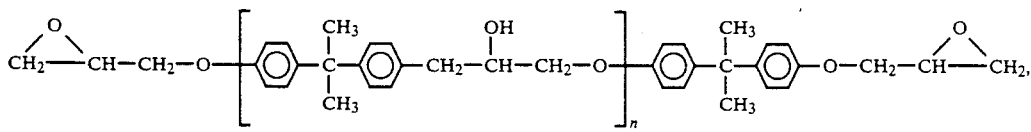

wherein n is 0 or at least 1. Preferably, the least one reaction product has an average molecular weight of from about 850 to about 1,150.

The epichlorohydrin and bisphenol A reaction product(s) may be present in an amount of from about 0.02 wt. % to about 2 wt. % of the halopolymer, preferably from about 0.05 wt. % to about 1.0 wt. %.

The stablizied polymers in accordance with the present invention may be prepared by mixing weight amounts of polymer powder and stabilizer components in a high intensity mixer such as a Henschel or Welex type mixer at 1000 rpm for 5 minutes at room temperature. After mixing, the polymer and stabilizer mixture may then be fed to an extruder, whereby the polymer and stabilizer mixture is extruded to form a stabilized polymer. Any extruder known to those skilled in the art may be employed, said extruder being operated under conditions known to those skilled in the art.

For determining thermal stability, color, and propensity for bubble formation for the stabilized polymers in accordance with the present invention, a 7 gram sample of a pelletized stabilized polymer composition, as well as comparative polymer compositions, was run on a melt index device in the manner described in ASTM D-1238 and ASTM D-3275 at a load of 2,160 g.

The 7 gram polymer sample is pushed by a known weight through a heated chamber. The polymer extrudate exits through an orifice of specific dimensions.

At 6 minutes after the start of the test, the amount of extrudate exiting the extruder after a specific cut time is measured, and the melt index in g/10 min. is then determined. The rest of the material is allowed to remain in the extruder until 30 minutes after the start of the test. At 30 minutes, the amount of extrudate exiting the extruder after a specific cut time is again measured. The melt index is again measured. The extrudate at 30 minutes is also examined for color change, bubble formation, and roughness. A polymer which is stabilized effectively shows little change in the melt index, as well as little color change and few bubbles.

The invention will now be described with respect to the following examples; however, the scope of the present invention is not intended to be limited thereby.

EXAMPLE 1

In this example, samples of an ethylene/chlorotrifluoroethylene copolymer having 50 mole % ethylene and 50 mole % chlorotrifluoroethylene, containing no stabilizers, were extruded at 6 minutes and at 30 minutes at 290° C. The melt indexes (MI) and the % changes in melt index for each sample run through the extruder were measured, according to the procedures of ASTM D-1238 and ASTM D-3275. The color of the extrudates and bubble formation in the extrudates were also observed. For purposes of explanation, color ratings are as follows:

A—slightly off-white
B—slightly yellowish
C—yellowish
D—slightly brown
E—brown
F—dark brown
G—black Bubble ratings are given as follows:
A—no bubbles
B—few bubbles
C—some bubbles
D—many bubbles The results are given in Table I below.

TABLE I

| Sample No. | MI (6 min.) | MI (30 min.) | % change | Ratings Color | Bubble |
|---|---|---|---|---|---|
| 1 | 27.07 | 23.10 | 14.7 | F | B |
| 2 | 25.90 | 21.84 | 15.7 | F | B |
| 3 | 25.55 | 18.61 | 27.2 | F | B |
| 4 | 26.80 | 15.39 | 42.6 | F | B |
| 5 | 24.28 | 14.00 | 42.3 | F | B |

EXAMPLE 2

Tetrakis [methylene 30-(3',5'-di-tert-butyl-4'-hydroxyphenyl) propionate], sold as Irganox 1010 by Ciba Geigy Corp. was added in amounts of 0.6 wt. % or 0.3 wt. % based on the weight of the copolymer, to a copolymer of 50 mole % ethylene and 50 mole % chlorotrifluoroethylene. The melt index at 6 minutes and 30 minutes at 290° C., as well as the % change in melt index, were measured and color and bubble ratings were observed. The results are listed in Table II below.

TABLE II

| Run No. | wt. % Irganox 1010 | MI (6 min:) | MI (30 min.) | % change | Ratings Color | Bubble |
|---|---|---|---|---|---|---|
| 1 | 0.6 | 25.29 | 21.64 | 15.4 | F | B |
| 2 | 0.6 | 25.15 | 21.72 | 13.6 | F | B |
| 3 | 0.6 | 25.60 | 22.53 | 12.0 | F | B |
| 4 | 0.6 | 24.42 | 22.93 | 6.1 | F | B |
| 5 | 0.6 | 24.77 | 22.11 | 10.7 | F | B |
| 6 | 0.3 | 25.32 | 23.41 | 7.5 | F | B |
| 7 | 0.3 | 25.65 | 23.67 | 7.7 | F | B |
| 8 | 0.3 | 25.32 | 22.22 | 12.2 | F | B |
| 9 | 0.3 | 25.25 | 23.40 | 7.3 | F | B |
| 10 | 0.3 | 24.49 | 24.33 | 0.7 | F | B |

EXAMPLE 3

0.3 wt. % tetrakis [methylene 3-(3',5'di-tert-butyl] 4'-hydroxyphenyl) propionate](Irganox 1010), and 0.3 wt. % of a mixture of 87.5% tris (nonylphenyl) phosphite and 12.5% tris (di-nonylphenyl) phosphite, sold by Uniroyal as Polygard, were added to samples of an ethylene/chlorotrifluoroethylene copolymer having 50 mole % ethylene and 50 mole % chlorotrifluoroethylene. The melt indexes for extrudates of each sample at 290° C. were measured at 6 minutes and 30 minutes, as well as % change in the melt index, were measured color and bubble ratings of each extrudate at 30 minutes were also taken. The results are listed below in Table III.

TABLE III

| Sample No. | MI (6 min.) | MI (30 min.) | % change | Ratings Color | Bubble |
|---|---|---|---|---|---|
| 1 | 25.69 | 25.94 | 0.93 | A | A |
| 2 | 26.6 | 25.96 | 2.42 | A | A |
| 3 | 25.64 | 26.82 | 4.60 | A | A |
| 4 | 25.86 | 26.75 | 3.43 | A | A |
| 5 | 26.41 | 25.72 | 2.62 | A | A |

EXAMPLE 4

0.3 wt. % of Irganox 1010, 0.3 wt. % of Polygard, and 0.3 wt. % of distearylthiodipropionate (DSTDP), based on the weight of the copolymer, were added to samples of an ethylene/chlorotrifluoroethylene copolymer having 50 mole % ethylene and 50 mole % chlorotrifluoroethylene. Melt index values at 290° C. at 6 minutes and 30 minutes, % change in melt index, and color and bubble ratings were taken as hereinabove described. The results are listed below in Table IV.

TABLE IV

| Sample No. | MI (6 min.) | MI (30 min.) | % change | Ratings Color | Bubble |
|---|---|---|---|---|---|
| 1 | 25.31 | 25.50 | 0.7 | A | A |
| 2 | 23.30 | 24.52 | 5.3 | B | A |
| 3 | 25.64 | 25.91 | 1.1 | A | A |
| 4 | 24.41 | 26.20 | 7.3 | B | A |
| 5 | 25.24 | 25.21 | 0.1 | A | A |

EXAMPLE 5

Irganox 1010, Polygard, and DSTDP, were added to samples of an ethylene/chlorotrifluoroethylene copolymer as described in Example 4, except that 0.15 wt. % of DSTDP was added to the copolymer. Melt index measurements at 6 minutes and 30 minutes and the % change in melt index were taken, and the color and bubble ratings were taken as well. The results are listed below in Table V.

TABLE V

| Sample No. | MI (6 min.) | MI (30 min.) | % change | Ratings Color | Bubble |
|---|---|---|---|---|---|
| 1 | 25.20 | 25.23 | 0.1 | A | A |
| 2 | 24.37 | 25.30 | 3.8 | B | A |
| 3 | 26.45 | 25.81 | 2.4 | A | A |
| 4 | 25.24 | 24.49 | 3.0 | B | A |
| 5 | 24.62 | 25.16 | 2.2 | A | A |

EXAMPLE 6

Irganox 1010, Polygard, and DSTDP were added to samples of an ethylene/chlorotrifluoroethylene copolymer of 50 mole % ethylene and 50 mole % chlorotrifluoroethylene in amounts of 0.3 wt. %, 0.4 wt. %, and 0.15 wt. %, respectively, based on the weight of the copolymer. Melt index values at 6 minutes and 30 minutes at 290° C., as well as the % change in melt index, for each sample were measured. The results were listed below in Table VI.

TABLE VI

| Sample No. | MI (6 min.) | MI (30 min.) | % change |
|---|---|---|---|
| 1 | 24.85 | 18.91 | 23.9 |
| 2 | 24.91 | 26.33 | 5.7 |
| 3 | 25.04 | 25.69 | 2.6 |
| 4 | 25.41 | 27.32 | 7.5 |
| 5 | 24.25 | 24.40 | 0.6 |

EXAMPLE 7

0.1 wt. % of Irganox 1010, 0.3 wt. % of Polygard, and 0.2 wt. % of DSTDP were added to samples of an ethylene/chlorotrifluoroethylene copolymer containing 50 mole % ethylene and 50 mole % chlorotrifluoroethylene. Melt index values at 6 minutes and 30 minutes at 290° C., and the % change in melt index, were measured, and the color and bubble ratings of the extrudates at 30 minutes were taken. The results are listed below in Table VII.

TABLE VII

| Sample No. | MI (6 min.) | MI (30 min.) | % change | Ratings Color | Bubble |
|---|---|---|---|---|---|
| 1 | 27.06 | 26.84 | 0.81 | C | A |
| 2 | 25.73 | 27.13 | 5.46 | C | A |
| 3 | 26.67 | 27.44 | 2.89 | D | A |
| 4 | 26.36 | 26.66 | 1.14 | C | A |
| 5 | 26.88 | 27.04 | 0.60 | D | A |

EXAMPLE 8

0.2 wt. % of Irganox 1010, 0.3 wt. % of Polygard, and 0.2 wt. % of DSTDP were added to samples of an ethylene/chlorotrifluoroethylene copolymer of 50 mole % ethylene and 50 mole % chlorotrifluoroethylene. Melt index values at 6 minutes and 30 minutes at 290° C. were measured, as well as the % change in melt index for each sample. Color and bubble ratings for each extrudate at 30 minutes were also taken, and the results are given below in Table VIII.

TABLE VIII

| Sample No. | MI (6 min.) | MI (30 min.) | % change | Ratings Color | Bubble |
|---|---|---|---|---|---|
| 1 | 25.88 | 26.61 | 2.84 | C | A |
| 2 | 25.94 | 26.85 | 3.50 | C | A |
| 3 | 25.62 | 26.66 | 4.07 | C | A |
| 4 | 25.53 | 26.16 | 2.44 | D | A |
| 5 | 26.06 | 26.35 | 1.12 | D | A |

EXAMPLE 9

0.3 wt. % of Irganox 1010, 0.3 wt. % of Polygard, and 0.3 wt. % of 1-[B-(n-octadecylthio) ethyl]-3(n-octadecylthio) cyclohexane (sold by Pennwalt Corporation as Anoxsyn 442) were added to samples of an ethylene/chlorotrifluoroethylene copolymer containing 50 mole % ethylene and 50 mole % chlorotrifluoroethylene. Melt index values at 6 minutes and 30 minutes at 290° C. were measured, as well as the % change in melt index for each sample. Color and bubble ratings for each extrudate at 30 minutes were also taken, and the results are given below in Table IX.

TABLE IX

| Sample No. | MI (6 min.) | MI (30 min.) | % change | Color | Bubble |
| --- | --- | --- | --- | --- | --- |
| 1 | 25.05 | 23.84 | 4.8 | D | A |
| 2 | 24.56 | 24.24 | 1.3 | D | A |
| 3 | 27.10 | 26.64 | 1.7 | C | A |
| 4 | 26.30 | 25.83 | 1.8 | C | A |
| 5 | 25.42 | 26.19 | 3.0 | C | A |

EXAMPLE 10

0.3 wt. % Irganox 1010, 0.4 wt. % Polygard, 0.15 wt. % DSTDP, and 0.1 wt. % bis [2-hydrox-5-t-octyl-3-(benzotrianzol-2-yl) phenyl] methane (sold by Fairmount Chemical Co., Inc., Newark, N.J., as Mixxim BB/100) was added to samples of an ethylene/chlorotrifluoroethylene copolymer containing 50 mole % ethylene and 50 mole % chlorotrifluoroethylene. The melt indexes of the samples at 6 minutes and 30 minutes at 290° C. were taken, as well as the % change in melt index for each sample. The results are listed below in Table X.

TABLE X

| Sample No. | MI (6 min.) | MI (30 min.) | % change |
| --- | --- | --- | --- |
| 1 | 24.68 | 23.01 | 6.8 |
| 2 | 25.61 | 25.30 | 1.2 |
| 3 | 25.16 | 25.57 | 1.6 |
| 4 | 25.50 | 24.12 | 5.4 |
| 5 | 25.12 | 25.88 | 3.1 |

EXAMPLE 11

0.3 wt. % Irganox 1010, 0.3 wt. % Polygard, and 0.15 wt. % zinc stearate were added to a sample of ethylene/chlorotrifluoroethylene copolymer containing 50 mole % ethylene and 50 mole % chlorotrifluoroethylene. The melt index of the composition at 6 minutes and at 30 minutes at 290° C. was measured. The melt index at 6 minutes was 27.11 and at 30 minutes was 20.41, giving a % change of 24.71%.

The extrudate at 6 minutes was off-white and smooth, and at 30 minutes was light-brown and smooth.

EXAMPLE 12

0.3 wt. % Irganox 1010, 0.3 wt. % Polygard, 0.15 wt. % zinc stearate, and 0.15 wt. % DSTDP were added to a sample of an ethylene/chlorotrifluoroethylene copolymer having 50 mole % ethylene and 50 mole % chlorotrifluoroethylene. The melt index of the extrudate at 6 minutes and 30 minutes at 290° C. was measured. The melt index at 6 minutes was 26.31, and the melt index at 30 minutes was 22.98, giving a % change of 12.96%. The extrudate at 6 minutes was off-white and smooth, and the extrudate at 30 minutes was light-brown and smooth.

EXAMPLE 13

0.1 wt. % Epon 1001F, 0.3 wt. % Polygard, 0.3 wt. % Irganox 1010, and 0.15 wt. % DSTDP were added to samples of an ethylene/chlorotrifluoroethylene copolymer containing 50 mole % ethylene and 50 mole % chlorotrifluoroethylene. The melt index at 6 minutes and 30 minutes at 290° C. was measured, as well as the % change in melt index for each sample. Color and bubble ratings of each extrudate at 30 minutes were also taken. The results are given below in Table XI.

TABLE XI

| Sample No. | MI (6 min.) | MI (30 min.) | % change | Color | Bubble |
| --- | --- | --- | --- | --- | --- |
| 1 | 27.60 | 20.56 | 25.5 | D | A |
| 2 | 26.29 | 24.57 | 5.5 | C | A |
| 3 | 25.42 | 24.11 | 5.2 | C | A |
| 4 | 24.90 | 22.52 | 9.6 | B | A |
| 5 | 24.86 | 24.22 | 2.6 | C | A |

EXAMPLE 14

Epon 1001F, Polygard, Irganox 1010, and DSTDP were added to sample of an ethylene/chlorotrifluoroethylene copolymer having 50 mole % ethylene and 50 mole % chlorotrifluoroethylene as described in Example 13, except that only 0.1 wt. % of Irganox, 1010 was added. The melt index at 6 minutes and 30 minutes at 290° C. was measured, and the % change in melt index was determined. The results are given below in Table XII.

TABLE XII

| Sample No. | MI (6 min.) | MI (30 min.) | % change |
| --- | --- | --- | --- |
| 1 | 26.71 | 26.13 | 2.2 |
| 2 | 25.58 | 26.23 | 2.5 |
| 3 | 25.70 | 23.40 | 8.9 |
| 4 | 25.32 | 25.14 | 0.7 |
| 5 | 26.28 | 26.64 | 1.4 |

EXAMPLE 15

Irganox 1010 was added in amounts of 0.6 wt. % or 0.3 wt. % based on the weight of the copolymer to samples of ethylene/chlorotrifluoroethylene copolymer containing 50 mole % ethylene and 50 mole % chlorotrifluoroethylene. The melt index of the samples at 6 minutes and 30 minutes at 305° C. were measured, as well as the % change in the melt index. Color and bubble ratings of the extrudates at 30 minutes were also taken. The results are listed below in Table XIII.

TABLE XIII

| Sample No. | wt. % Irganox 1010 | MI (6 min.) | MI (30 min.) | % change | Color | Bubble |
| --- | --- | --- | --- | --- | --- | --- |
| 1 | 0.6 | 35.54 | 30.18 | 15.08 | G | B |
| 2 | 0.6 | 35.34 | 26.03 | 26.34 | G | B |
| 3 | 0.6 | 34.97 | 24.34 | 30.40 | G | B |
| 4 | 0.3 | 33.58 | 21.47 | 36.06 | G | B |
| 5 | 0.3 | 34.86 | 18.24 | 47.68 | G | B |
| 6 | 0.3 | 33.52 | 20.38 | 39.20 | G | B |

EXAMPLE 16

0.6 wt. % Irganox 1010 and 0.3 wt. % Polygard, were added to sample of an ethylene/chlorotrifluoroethylene copolymer, based on the weight of the copolymer. The copolymer contained 50 mole % ethylene and 50 mole % chlorotrifluoroethylene. The melt index of each sample at 6 minutes and 30 minutes at 305° C. was measured, as well as the % change in melt index for each sample. The color and bubble ratings of the extradates at 30 minutes were also taken. The results are listed below in Table XIV.

TABLE XIV

| Sample No. | MI (6 min.) | MI (30 min.) | % change | Color | Bubble |
| --- | --- | --- | --- | --- | --- |
| 1 | 35.41 | 36.49 | 3.05 | A | A |

TABLE XIV-continued

| Sample No. | MI (6 min.) | MI (30 min.) | % change | Ratings Color | Ratings Bubble |
|---|---|---|---|---|---|
| 2 | 35.67 | 36.88 | 3.39 | B | A |
| 3 | 35.96 | 36.02 | 0.17 | B | A |
| 4 | 36.64 | 36.61 | 0.08 | B | A |
| 5 | 36.53 | 37.61 | 2.96 | D | A |

EXAMPLE 17

Irganox 1010 and Polygard were added to an ethylene/chlorotrifluoroethylene copolymer containg 50 mole % ethylene and 50 mole % chlorotrifluoroethylene as described in Example 16 except that only 0.3 wt. % of Irganox 1010 was added. The melt index at 6 minutes and 30 minutes at 305° C. was measured, as well as the % change in melt index for each sample. The results are listed below in Table XV.

TABLE XV

| Sample No. | MI (6 min.) | MI (30 min.) | % change | Ratings Color | Ratings Bubble |
|---|---|---|---|---|---|
| 1 | 34.31 | 35.89 | 4.60 | A | A |
| 2 | 35.39 | 35.60 | 0.59 | A | A |
| 3 | 35.18 | 35.29 | 0.31 | A | A |
| 4 | 35.56 | 35.58 | 0.06 | B | A |
| 5 | 35.64 | 36.23 | 1.66 | B | A |

EXAMPLE 18

0.3 wt. % Irganox 1010, 0.3 wt. % Polygard, and 0.3 wt. % DSTDP were added to samples of an ethylene/chlorotrifluoroethylene copolymer, based on the weight of the copolymer. The copolymer contained 50 mole % ethylene and 50 mole % chlorotrifluoroethylene. The melt index at 6 minutes and 30 minutes at 305° C. for each sample was measured as well as the % change in melt index for each sample. The color and bubble ratings of the extrudates at 30 minutes for each sample were also taken. The results are listed below in Table XVI.

TABLE XVI

| Sample No. | MI (6 min.) | MI (30 min.) | % change | Ratings Color | Ratings Bubble |
|---|---|---|---|---|---|
| 1 | 35.26 | 38.71 | 9.78 | C | A |
| 2 | 36.23 | 39.19 | 8.17 | C | A |
| 3 | 35.36 | 43.50 | 23.02 | C | A |
| 4 | 35.56 | 38.72 | 8.89 | C | A |
| 5 | 36.01 | 38.25 | 6.22 | C | A |

EXAMPLE 19

Irganox 1010, Polygard, and DSTDP, were added to samples of an ethylene/chlorotrifluoroethylene copolymer containing 50% mole % ethylene and 50 mole % chlorotrifluoroethylene, as described in Example 18, except that 0.15 wt. % of DSTDP was added. The melt index of each sample at 6 minutes and 30 minutes at 305° C. was measured, as well as the % change in melt index for each sample. The results are given in Table XVII below.

TABLE XVII

| Sample No. | MI (6 min.) | MI (30 min.) | % change |
|---|---|---|---|
| 1 | 34.80 | 37.67 | 8.25 |
| 2 | 35.30 | 36.88 | 4.48 |

EXAMPLE 20

0.3 wt. % Irganox 1010, 0.3 wt. % Polygard, and 0.15 wt. % zinc stearate were added to samples of an ethylene/chlorotrifluoroethylene copolymer, based on the weight of the copolymer. The copolymer contained 50 mole % ethylene and 50 mole % chlorotrifluoroethylene. The melt index of each sample at 305° C. was measured, as well as the % change in melt index for each sample. Color and bubble ratings for extrudates of each sample at 30 minutes were also taken. The results are listed below in Table XVIII.

TABLE XVII

| Sample No. | MI (6 min.) | MI (30 min.) | % change | Ratings Color | Ratings Bubble |
|---|---|---|---|---|---|
| 1 | 38.93 | 33.90 | 12.92 | D | D |
| 2 | 39.44 | 38.90 | 1.37 | D | D |
| 3 | 39.36 | 39.48 | 0.30 | D | D |

The results of the above examples indicate that an ethylene/chlorotrifluoroethylene copolymer having as a stabilizing system an ester of a (4-hydroxy-5-alkylphenyl) alkanoic-acid, and at least one phosphite, in accordance with the present invention, as well as possibly including other stablizers as hereinabove described, have improved melt stability at high temperatures, as compared to an ethylene/chlorotrifluoroethylene copolymer without stabilizers or an ethylene/chlorotrifluoroethylene copolymer having only an ester of a (4-hydroxy-5alkylphenyl) alkanoic acid as a stabilizer.

Advantages of the present invention include the ability to provide a stabilzer system for a halopolymer, such as a fluoropolymer and in particular an ethylene/chlorotrifluoroethylene copolymer, which results in stabilized halopolymer compositions having improved melt stability, as well as being less likely to become discolored upon heating or to form bubbles. Such compositions may be melt processed and extruded at high temperatures (e.g., up to about 305° C.) and still remain effectively stable. Such stability enables the compositions of the present invention to be used effectively in a variety of applications, such as wire and cable coating applications.

It is to be understood, however, that the scope of the present invention is not be limited to the specific embodiments described above. Numerous modifications may be made to the teachings contained herein, and the invention may be practiced other than as particularly described and still be within the scope of the accompanying claims.

What is claimed is:

1. The composition comprising a halopolymer an ethylene/chlorotrifluoroethylene copolymer thermal stabilizing amount of:
   (a) an ester of a (4-hydroxy-5-alkylphenyl) alkanoic acid, said ester being of the formula:

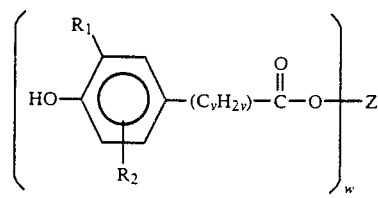

wherein $R_1$ is methyl, ethyl, or an alpha-branched alkyl group of from 3 to 10 carbon atoms; v has a value of from 1 to 6; w has a value of from 2 to 6; Z is an aliphatic hydrocarbon of the formula: $C_yH_{2y+2-w}$ in which y has a value of from 2 to 18 when w is 2, and a value of 3 to 6 when w is greater than 2, the value of y in all cases being equal to or greater than that of w;

(b) at least one phosphite of the formula:

$$P \!\!+\!\! O \!-\!\! \bigcirc \!\!-\!\! (R)_n \,)_3,$$

wherein R is an alkyl or cycloalkyl group having $$CH_2\overset{O}{-\!\!\!-\!\!\!-}CH\!-\!CH_2\!-\!O\!-\!\!\left[\!\bigcirc\!\!-\!\!\underset{CH_3}{\overset{CH_3}{C}}\!\!-\!\!\bigcirc\!\!-\!CH_2\!-\!\underset{OH}{\overset{}{C}H}\!-\!CH_2\!-\!O\!\right]_n\!\!\!-\!\bigcirc\!\!-\!\!\underset{CH_3}{\overset{CH_3}{C}}\!\!-\!\!\bigcirc\!\!-\!O\!-\!CH_2\!-\!CH\overset{O}{-\!\!\!-\!\!\!-}CH_2,$$

from 1 to about 18 carbon atoms, and n is at least 1; and (c) a thioester.

2. The composition of claim 1 wherein said ethylene/chlorotrifluoroethylene copolymer contains from about 40 mole % to about 60 mole % ethylene and from about 40 mole % to about 60 mole % chlorotrifluoroethylene.

3. The composition of claim 1 wherein said ethylene/chlorotrifluoroethylene copolymer contains about 50 mole % ethylene and about 50 mole % chlorotrifluoroethylene.

4. The composition of claim 1 wherein said ester is present in an amount of from about 0.05 wt. % to about 3 wt. % based on the weight of said halopolymer.

5. The composition of claim 4 wherein said ester is present in an amount of from about 0.1 wt. % to about 1.5 wt. % based on the weight of said halopolymer.

6. The composition of claim 1 wherein said at least one phosphite is present in an amount of from about 0.05 wt. % to about 3 wt. % based on the weight of said halopolymer.

7. The composition of claim 6 wherein said at least one phosphite is present in an amount of from about 0.1 wt. % to about 1.5 wt. % of the weight of said halopolymer.

8. The composition of claim 1 wherein said ester is tetrakis.

9. The composition of claim 1 wherein said at least one phosphite consists of a mixture of:

$$P\!\!+\!\!O\!-\!\!\bigcirc\!\!-\!\!C_9H_{19}\,)_3 \text{ and } P\!\!+\!\!O\!-\!\!\underset{C_9H_{19}}{\overset{C_9H_{19}}{\bigcirc}}\,)_3$$

10. The composition of claim 1 wherein said thioester is present in an amount from about 0.02 wt. % to about 3 wt. % based on the weight of the halopolymer.

11. The composition of claim 10 wherein said thioester is distearylthiodipropionate.

12. The composition of claim 1, and further comprising an effective stabilizing amount of a reaction product of epichlorohydrin and bisphenol A, said reaction product being of the formula:

wherein n is 0 or at least 1.

13. The composition of claim 12 wherein said reaction product of epichlorohydrin and bisphenol A is present in an amount of from about 0.02 wt. % to about 2 wt. % based on the weight of the halopolymer.

14. The composition of claim 13 wherein said reaction product of epichlorohydrin and bisphenol A is present in an amount of from about 0.05 wt. % to about 1.0 wt % based on the weight of the halopolymer.

15. The composition of claim 1, and further comprising an effective stabilizing amount of a sulfide selected from the group consisting of:

$$R_1S\!-\!\!\underset{}{\overset{R_2}{\bigcirc}}\!\!-\!(R')_nSR_1 \text{ and } R_1S\!-\!\!\bigcirc\!\!\bigcirc\!\!-\!SR_1,$$

wherein $R_1$ is an alkyl group having from about 8 to about 20 carbon atoms, $R_2$ is H or an alkyl group having 1 to about 4 carbon atoms, R' is an alkyl or alkenyl group having up to about 12 carbon atoms, and n is 0 or 1.

16. The composition of claim 15, wherein the sulfide is of the formula:

$$C_{18}H_{37}S\!-\!\!\bigcirc\!\!-\!(R')_n\!-\!S\!-\!C_{18}H_{37},$$

wherein R' is an alkyl or alkenyl group having up to about 12 carbon atoms, and n is 0 or 1.

17. The composition of claim 15 wherein said sulfide is present in an amount of from about 0.02 wt. % to about 2 wt. % based on the weight of the halopolymer.

18. The composition of claim 17 wherein said sulfide is present in an amount of from about 0.05 wt. % to about 1.0 wt. % based on the weight of the halopolymer.

19. The composition of claim 17 wherein n is 1 and R' is an ethyl group.

* * * * *